UNITED STATES PATENT OFFICE.

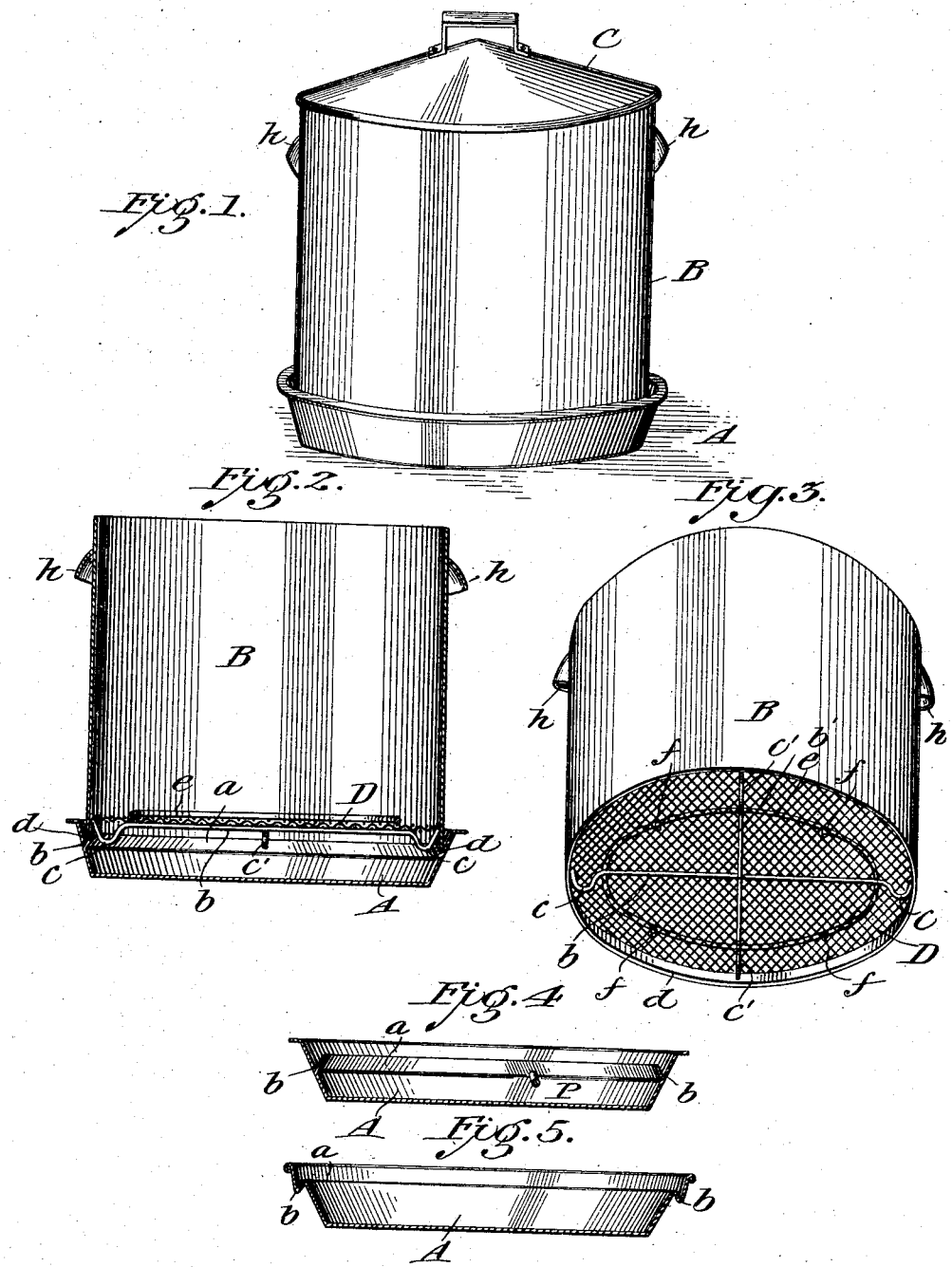

ALBERT E. PERKINS, OF WOOSTER, OHIO.

DEVICE FOR CLEANSING AND DRYING DISHES.

1,226,993. Specification of Letters Patent. Patented May 22, 1917.

Application filed September 25, 1914. Serial No. 863,549.

*To all whom it may concern:*

Be it known that I, ALBERT E. PERKINS, a citizen of the United States, residing at Wooster, in the county of Wayne and State of Ohio, have invented a new and useful Device for Cleansing and Drying Dishes, of which the following is a specification.

My invention relates to devices for cleaning, rinsing and drying dishes; its objects are, first, to provide simple and inexpensive and efficient means for thoroughly cleansing and drying dishes after washing the same in some detergent solution, and secondly, to provide means for aerating the dishes during the said cleansing and drying process by the steam and heat generated therein.

It consists of the novel apparatus hereinafter fully set forth and stated in the appended claim.

My invention is illustrated by the accompanying drawings in which similar letters of reference indicate like parts.

Referring thereto, Figure 1 is a view in perspective of my improved dish-cleanser and drier with the associated parts in position.

Fig. 2 is a vertical cross section of Fig. 1, without cover, along its longitudinal diameter; Fig. 3 is a detached view of the drier body or cage, in perspective; and Fig. 4 is a vertical cross section of the basin or pan cut through its diameter; and Fig. 5 is a modification of Fig. 4.

In the drawings, A is a basin or pan, substantially like those in common use for washing dishes, etc., B is a body or cage for holding the dishes during the cleansing and drying process; D is the cage bottom, preferably made of galvanized wire woven in mesh. $a$ is an upwardly and inwardly projecting strip secured to the inner surface of the pan A nearly mid way between its top and bottom, and flaring from the pan surface so as to form a groove $b$ in connection therewith, adapted to receive and hold in position therein the lower edge or rim of the cage B, the latter being projected downwardly from the bottom D in a marginal extension or rim $d$, for such purpose, as shown in Fig. 2.

If desired the groove $b$ may be formed in the pan integral therewith, as shown in Fig. 5, to accomplish the same purpose.

One or more suitably disposed rings $e$ may be removably secured on the inner surface of the bottom D to lodge and hold the dishes in proper position thereon, said rings being preferably secured by means of downwardly projecting studs $f\ f$ in connection with the wire mesh bottom D, as shown in Fig. 3.

$g\ g'$ are cross rods mounted upon and across the lower surface of the bottom D to support the same horizontally, and $c\ c'$ are bent end portions of said cross-rods, adapted to rest against the inner margin of said groove $b$, when said cage is mounted, and also to serve as feet whereon to rest said cage when removed from the pan.

The operation of my invention is as follows—Dishes prepared for rinsing and drying, as aforesaid, are placed in said cage in position to drain freely; the pan A is partly filled with water heated to boiling, and the cage with its load of dishes is then placed in position in said groove $b$, as aforesaid, and said boiling continued a few minutes while the cover C is in position on said cage. The steam from said boiling envelops and is partly condensed upon the exposed surfaces of said dishes, thereby thoroughly heating and rinsing the same, and by means of the heat and moisture, they are cleansed and also sanitarily cleansed in the process. The water from such condensed steam drops down from the dishes into said pan, and, after the boiling has been continued for a few minutes, the cage is removed from the pan to some convenient stand surface, not shown in the drawings, and allowed to stand thus removed until the dishes within the cage are cooled. Thus, during the cooling process, the dishes are also thoroughly dried by the inflow thereon of air currents upwardly from the cage bottom through the mass of dishes, whereby all moisture is evaporated therefrom. This inflow of air currents is accomplished by means of the supports $c\ c'$ on which the cage rests at a distance from the stand surface to which it was removed as aforesaid, thereby affording ample inlets for the air currents upwardly through the perforated bottom and mass of dishes, the cage cover being removed during said cooling process to facilitate the upward draft naturally caused by the hot air within the cage escaping upwardly through the open top of the cage.

I am aware it is not new to construct a vessel made up of several parts for fumigating clothing and the like, the parts being joined by a water seal, and such I do not broadly claim. In my apparatus a water seal and space for fumigating chemicals are not required, as my invention relates to the means set forth for condensing steam upon and heating a mass of dishes within a removable cage mounted on a basin of boiling water, and provision for supporting the cage, when removed from the basin, in such manner as to freely admit air currents upwardly through the mass of dishes within the cage, whereby after being thoroughly heated by the steam and rinsed by its condensation thereon, they are thoroughly dried in the cooling process, as aforesaid. Means for supporting the mass of dishes on a perforated surface loosely so as to expose them to the action of the steam and heat and the air currents, substantially as set forth, are also new in combination with the other elements of my invention.

Having thus fully described my invention, what I claim is—

A device for cleansing and drying dishes, comprising in combination, a dish-pan having a circumferential groove formed in its sides between its top and bottom, draining means for said groove, a cage for dishes having an open top and perforated bottom, a rim projected from said cage below said bottom adapted to seat within said groove, a dish mounting ring removably mounted on said bottom, cross-rods within said rim underneath said bottom having projections normally engaging inwardly of the inner wall of the groove and adapted to support said cage when removed from said pan, and a cover for said cage.

In witness whereof, I hereunto set my hand this 20th day of August, A. D. 1914.

ALBERT E. PERKINS.

Witnesses:
JOHN C. MCCLARAN,
HIRAM B. SWARTZ.

Copies of this patent may be obtained for five cents each, by addressing the "Commissioner of Patents, Washington, D. C."